Patented Nov. 15, 1927.

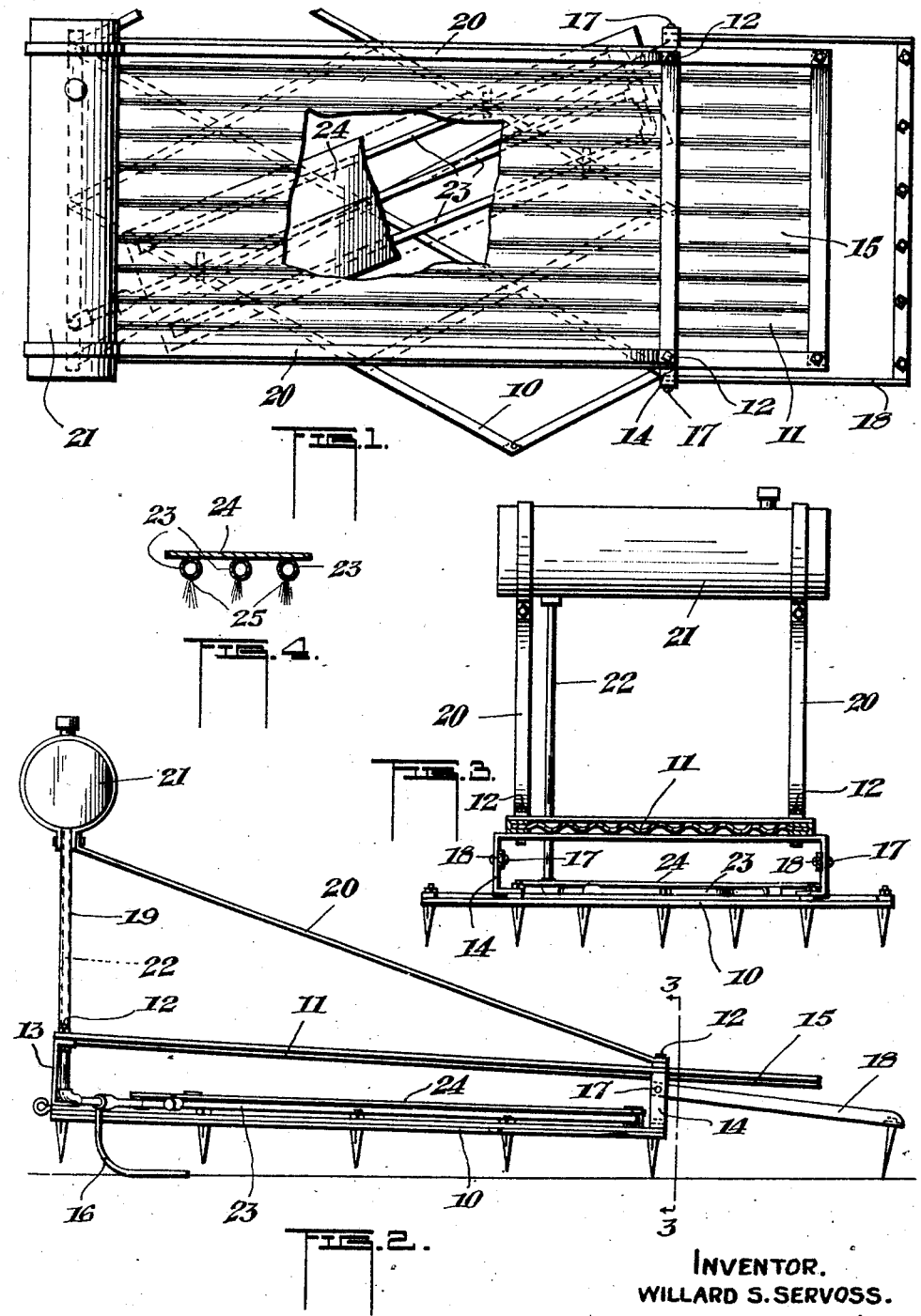

1,649,550

UNITED STATES PATENT OFFICE.

WILLARD STRAIT SERVOSS, OF BRIERCREST, SASKATCHEWAN, CANADA, ASSIGNOR OF ONE-THIRD TO HOWARD O. OSBORNE, OF MOOSE JAW, SASKATCHEWAN, CANADA.

ATTACHMENT FOR WEED BURNERS.

Application filed February 11, 1927. Serial No. 167,576.

This invention relates to improvements in attachments for weed burners and more particularly to hood and rake attachments for machines of this description.

The objects of the invention are to provide a simply constructed and durable weed burning machine that can be manufactured and placed on the market at comparatively low cost and which will more satisfactorily perform the functions required of it.

With these and other objects in view hereinafter more fully referred to, the invention comprises a harrow member provided with rake and hood attachments whereby the heat and flame from the burning material in the harrow is automatically utilized to burn all the stubble and weeds close to ground. Where the material such as weeds and rubbish is not sufficient, auxiliary fuel supply means are associated with the harrow.

Referring now to the drawings in which like characters of reference indicate corresponding parts in each figure—

Figure 1 is a top plan view of my improved weed burning machine partly broken away.

Figure 2 is a side elevation.

Figure 3 is a section on the line 3—3 of Figure 2.

Figure 4 is a sectional detail of the burner pipes.

Referring more particularly to the drawings in which a preferred example of my invention is illustrated, 10 designates a harrow as a whole of well known construction.

Heretofore many farmers burning stubble and weeds succeed fairly well with an ordinary bare harrow if the stubble is heavy and the fire kept burning continuously but where the stubble is light it is not by any means possible to do this and applicant consequently conceived the idea of a weed burning harrow that would give satisfactory results under all conditions by utilizing the heat and the flame from the rubbish burning in the apparatus by holding it down to the ground.

For this purpose a metal hood or hoods 11 is provided detachably secured by means of bolts 12 on raisers 13 and 14 to the ends of the harrow 10. This hood is in spaced relationship, as will be noted in Figure 2, to the harrow and protrudes as at 15 beyond the back of the harrow to get the full benefit of the heat before it escapes from the hood. The hood is also arranged at a slope from the front to the back. Furthermore the front of the harrow is carried clear of the ground on runners or shoes 16 so that the stubble and weeds are picked up from the centre of the harrow, back where the burning is done, all heat and flame being held on the ground. Pivotally mounted at 17 on the end of the raiser 14 is a rake attachment 18 adapted to trail behind and pick up any bunches which might roll out from under the harrow. Supported on the uprights 19 above the harrow, the uprights being in turn braced as at 20, are auxiliary fuel supply means in the form of a fuel tank 21 communicating through a pipe 22 with a return burner pipe 23 on the harrow (see Figure 1) and over which is secured a sheet metal plate 24. This burner pipe is provided with suitable jet orifices or openings 25 while the sheet of metal 24 is designed to hold the fire down on the ground.

From the foregoing the operation of the improved weed burner will be apparent and it will be seen that under ordinary conditions where the stubble and weeds are thick the torch is carried on the harrow and the stubble and weeds consumed close to the ground as the harrow is drawn along, the rake attachment 18 picking any that may roll out from under the harrow, the remainder being picked up by the harrow and burnt. The combination with the rake and harrow itself of a detachable cover 11 enables a consuming heat to be provided where it is wanted. On the other hand if the weeds and stubble are not sufficient to cause the fire to burn continuously the auxiliary tank and jet pipes connected thereto provide all that is necessary for this purpose.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:—

The combination with a harrow mounted on runners and provided with a pivotally mounted rake attachment, of a hood of corrugated metal for the harrow and protruding therebeyond, raisers on the harrow adapted to support the hood at a slant, a fuel supply tank on the harrow, pipe lines provided with jet orifices extending longitudinally of the harrow and communicating with the fuel tank, and a flame directing plate between the hood and the harrow.

In witness whereof I have hereunto set my hand.

WILLARD STRAIT SERVOSS.